US012779400B2

(12) United States Patent
Tabatabai et al.

(10) Patent No.: US 12,779,400 B2
(45) Date of Patent: Nov. 3, 2026

(54) SYSTEM AND PROCESS FOR MEMBRANE FOULING CONTROL, A MEMBRANE FOULING CONTROL ADDITIVE, AN UPGRADE KIT AND AN UPGRADE METHOD

(71) Applicant: S. A. Lhoist Recherche et Developpement, Ottignies Louvain-la-Neuve (BE)

(72) Inventors: S. Assiyeh A. Tabatabai, Forest (BE); Robert Sebastian Gartner, Buizingen (BE); Xavier Pettiau, Couillet (BE); Narahari N. Kramadhati, La Habra, CA (US)

(73) Assignee: S. A. Lhoist Recherche et Developpement, Ottignies Louvain-la-Neuve (BE)

( * ) Notice: Subject to any disclaimer, the term of this patent is extended or adjusted under 35 U.S.C. 154(b) by 391 days.

(21) Appl. No.: 17/919,598

(22) PCT Filed: Apr. 23, 2021

(86) PCT No.: PCT/EP2021/060758
§ 371 (c)(1),
(2) Date: Oct. 18, 2022

(87) PCT Pub. No.: WO2021/214334
PCT Pub. Date: Oct. 28, 2021

(65) Prior Publication Data

US 2023/0158456 A1 May 25, 2023

(30) Foreign Application Priority Data

Apr. 23, 2020 (EP) .................................... 20171107
Apr. 23, 2020 (EP) .................................... 20171118

(51) Int. Cl.
*B01D 61/16* (2006.01)
*B01D 61/14* (2006.01)
(Continued)

(52) U.S. Cl.
CPC ........... *B01D 61/16* (2013.01); *B01D 61/145* (2013.01); *B01D 61/147* (2013.01); *B01D 61/22* (2013.01);
(Continued)

(58) Field of Classification Search
CPC .... B01D 61/16; B01D 61/145; B01D 61/147; B01D 65/02; B01D 65/08
See application file for complete search history.

(56) References Cited

U.S. PATENT DOCUMENTS 3,996,131 A * 12/1976 Conn .................... B01D 65/08 210/651
4,207,183 A * 6/1980 Herrigel ................ B01D 65/08 210/639
(Continued)

FOREIGN PATENT DOCUMENTS

CA 2243774 A1 1/1999
EP 1920821 A1 5/2008
(Continued)

OTHER PUBLICATIONS

Lorgouilloux et al. "An innovative low density synthetic carbonate with a composite structure" Key Engineering Materials Online: Jun. 24, 2014 ISSN: 1662-9795, vol. 617, pp. 3-9 doi:10.4028/www.scientificnet/KEM.617.3 (Year: 2014).*
(Continued)

*Primary Examiner* — Benjamin L Lebron
*Assistant Examiner* — Marriah Ellington
(74) *Attorney, Agent, or Firm* — Charles D. Gunter, Jr.

(57) ABSTRACT

A system for membrane fouling control configured to run one or more filter cycles, wherein each filter cycle of the one
(Continued)

or more filter cycles includes an operation mode and a cleaning mode. The system includes: a first conduct portion; a second conduct portion; a membrane arranged between the first conduct portion and the second conduct portion. The membrane is configured in the operation mode to filter a liquid to be filtered by conducting it from the first conduct portion to the second conduct portion. A fouling control means filled with fouling control particles is added in the operation mode in the first conduct portion so that a dynamic protective layer is formed on the membrane. The fouling control particles are mineral particles based on calcium and/or magnesium.

9 Claims, 3 Drawing Sheets

(51) Int. Cl.

| | |
|---|---|
| ***B01D 61/22*** | (2006.01) |
| ***B01D 65/02*** | (2006.01) |
| ***B01D 65/08*** | (2006.01) |
| ***B01D 67/00*** | (2006.01) |
| ***C02F 1/00*** | (2023.01) |
| ***C02F 1/44*** | (2023.01) |
| *C02F 103/00* | (2006.01) |
| *C02F 103/06* | (2006.01) |
| *C02F 103/08* | (2006.01) |

(52) U.S. Cl.

CPC ............. *B01D 65/02* (2013.01); *B01D 65/08* (2013.01); *B01D 67/0088* (2013.01); *C02F 1/008* (2013.01); *C02F 1/444* (2013.01); *B01D 2311/04* (2013.01); *B01D 2321/04* (2013.01); *B01D 2321/16* (2013.01); *C02F 2103/007* (2013.01); *C02F 2103/06* (2013.01); *C02F 2103/08* (2013.01); *C02F 2209/005* (2013.01); *C02F 2303/16* (2013.01); *C02F 2303/22* (2013.01)

(56) References Cited

U.S. PATENT DOCUMENTS

| | | | | |
|---|---|---|---|---|
| 8,137,444 | B2 * | 3/2012 | Farsad | B01D 53/60 95/236 |
| 2003/0170306 | A1 * | 9/2003 | Raether | C08F 293/00 526/217 |
| 2011/0186513 | A1 * | 8/2011 | Vuong | B01D 63/082 210/636 |
| 2012/0211421 | A1 * | 8/2012 | Self | B01D 61/00 210/205 |
| 2014/0000485 | A1 * | 1/2014 | Smith | C09C 1/021 106/464 |
| 2015/0000446 | A1 | 1/2015 | Yamamoto et al. | |
| 2015/0010458 | A1 | 1/2015 | Buri et al. | |
| 2016/0145155 | A1 * | 5/2016 | Lorgouilloux | C04B 28/02 252/62 |
| 2017/0349759 | A1 * | 12/2017 | Buri | C09C 3/041 |

FOREIGN PATENT DOCUMENTS

| | | | | |
|---|---|---|---|---|
| EP | 1578693 | B1 * | 8/2012 | A61L 2/0017 |
| EP | 2662416 | A1 | 11/2013 | |
| EP | 2322581 | B1 * | 8/2015 | C01F 5/24 |
| JP | 2017136570 | A | 8/2017 | |
| WO | WO-2013139957 | A1 * | 9/2013 | C01F 11/18 |
| WO | WO-2017009792 | A1 * | 1/2017 | B01D 65/02 |

OTHER PUBLICATIONS

Synder. "What are Microfiltration Membranes?" Jul. 14, 2024. https://synderfiltration.com/microfiltration/membranes/. Accessed Mar. 26, 2025 (Year: 2014).*

DuPont, "Ultrafiltration (UF)". Oct. 2018. https://www.dupont.com/water/technologies/ultrafiltration-ufhtml. Accessed Mar. 26, 2025 (Year: 2018).*

Su et al. Journal of Membrane Science. 423-424(2012)324â331. Accessed Sep. 27, 2025. http://dx.doi.org/10.1016/j.memsci.2012.08.041 (Year: 2012).*

Summons to Attend Oral Proceedings pursuant to Rule 115(1) EPC; Issued in EP Application 27 720 510.3 by European Patent Office; Jan. 21, 2025; 9 pages.

Int'l Pat. Appl. No. PCT/EP2021/060758, International Search Report, 2 pages, Jun. 11, 2021.

L. Haurie, et al. "Effects of Milling on the Thermal Stability of Synthetic Hydromagnesite," Materials Reseach Bulletin, vol. 32, Issue 6, Jun. 2007, pp. 1010-1018.

* cited by examiner

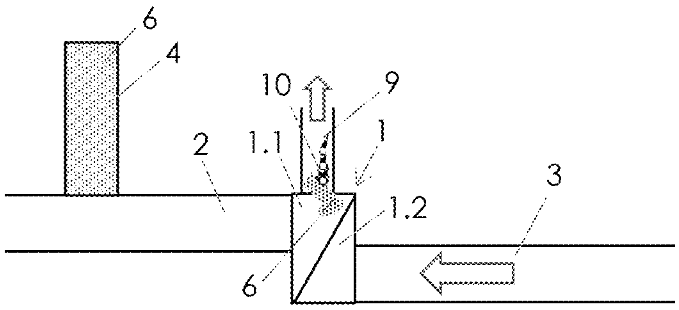
Fig. 5
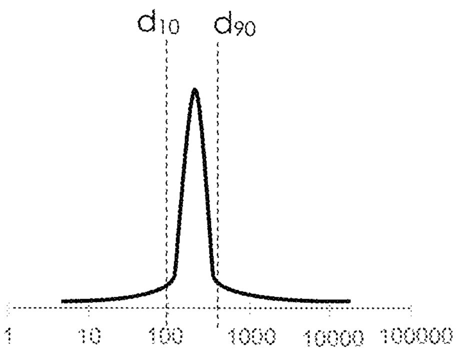
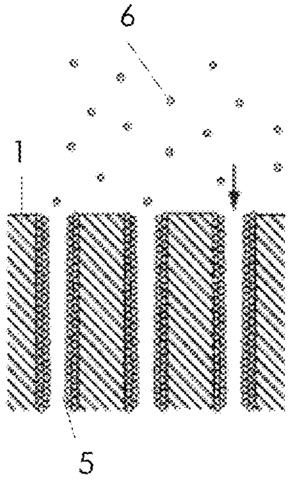
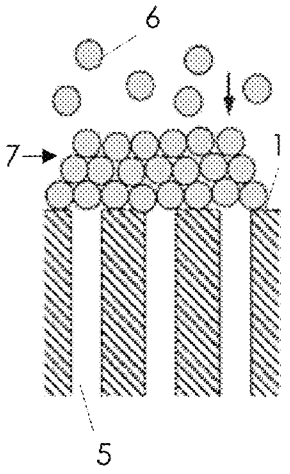
Fig. 6 Fig. 7 Fig. 8
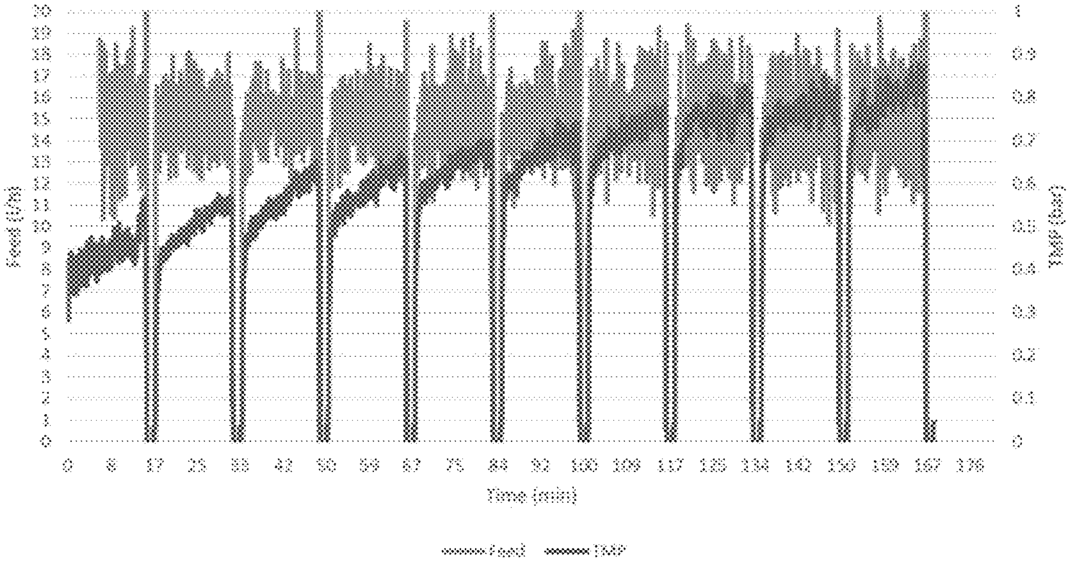
Fig. 9

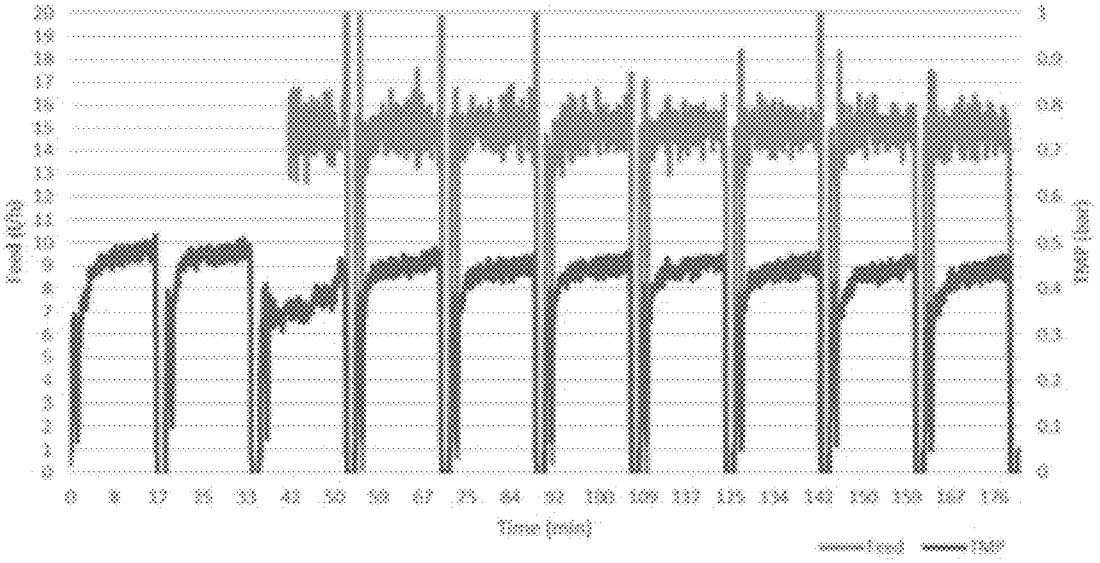
Fig. 10
| defined pore size / nm | MWCO / kDa | membrane type |
|---|---|---|
| 0.1 | 0.75 | Reverse osmosis |
| 2.0 | 15 | nanofiltration |
| 6.3 | 47 | nanofiltration |
| 10 | 75 | ultrafiltration |
| 20 | 150 | ultrafiltration |
| 63 | 473 | ultrafiltration |
| 100 | 750 | ultrafiltration |
| 200 | 1496 | microfiltration |
| 631 | 4732 | microfiltration |
| 1000 | 7500 | microfiltration |
Fig. 11
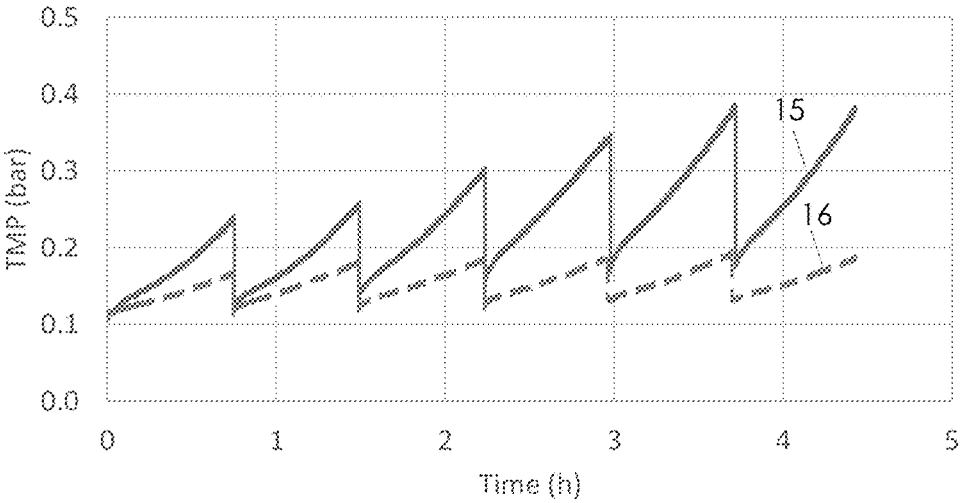
Fig. 12

SYSTEM AND PROCESS FOR MEMBRANE FOULING CONTROL, A MEMBRANE FOULING CONTROL ADDITIVE, AN UPGRADE KIT AND AN UPGRADE METHOD

TECHNICAL FIELD

The present invention relates to a system and process for membrane fouling control and a membrane fouling control additive and an upgrade kit and upgrade method to upgrade an existing membrane filtration system for fouling control.

PRIOR ART AND BACKGROUND OF THE PRESENT INVENTION

Membranes are used for water treatment in a number of industries, including municipal drinking water supply and wastewater treatment, food and beverage processes, pharmaceutical, oil&gas, and many more.

The main operational problem of membrane filtration is fouling. Foulants carried in the liquid to be filtered are deposited on the membrane and lead to a degradation of the membrane performance. There are different types of fouling. Colloidal/particulate fouling is formed by an accumulation of foulants on the membrane surface and inside the pores reducing membrane permeability. Organic fouling is caused by natural or synthetic organic matter from the source liquid. Biofouling is stemming from aquatic organisms such as bacteria or algae which can form colonies on the membrane surface and cause biofouling. Inorganic fouling or scaling is formation of hard mineral deposits on the membrane surface as supersaturation limits of sparingly soluble salts is exceeded. Therefore, most membrane applications require fouling control measures to minimize the negative impacts of fouling on membrane operation/lifetime.

It was found that fouling in each application depends largely on the feed water quality, the membrane and the operating conditions. One strategy to minimize fouling is thus the correct choice of the membrane and of the operating conditions depending on the application, i.e. depending on the type of foulants in the liquid to be filtered. However, this requires a large variety of membrane filters for handling the large variety of different fouling situations. This increases the difficulty in projecting a filter application as each application is slightly different.

Another solution against fouling is periodic cleaning of the membrane. This can be achieved by physical cleaning, biological cleaning or chemical cleaning. Physical cleaning can be gas scour, sponges, water jets or backwashing using permeate. Physical cleaning could also include some abrasive cleaning agents added in the liquid to be filtered. Chemical cleaning involves the use of chemicals, e.g. acids, bases, oxidants, enzymatic components, surfactants, complexing agents and formulated detergents to remove foulants and impurities. Chemical cleaning is normally more effective to remove fouling which cannot be removed by physical cleaning. However, chemical cleaning creates additional waste and has thus a negative environmental impact. Physical cleaning might be better for the environment but needs to be performed more often or sometimes might not be sufficient to remove the foulants from the membrane. The mentioned membrane cleanings are also called membrane remediations, i.e. measures to re-establish the membrane functionalities after fouling has occurred.

Physical cleaning and chemical cleaning can also be combined. An example can be found in document EP1920821 using amongst other, water insoluble calcium carbonate.

A further solution is the pretreatment of the water to be filtered. The pretreatment reduces the foulants in the water to be filtered before they arrive at the membrane or changes the characteristics of the foulants in such a way as to reduce or limit their interaction with the membrane material and structure. Examples of a pretreatment are coagulation, adsorption, oxidation, magnetic ion exchange (MIEX), biological treatment or some integrated pretreatments. Normally this is achieved by adding a fouling control additive into the water to be filtered to condition the water to be filtered, i.e. to modify or reduce the amount of foulants in the water to be filtered before reaching the membrane. However, the efficiency of the pretreatment of the water depends on many factors like the type of agents (coagulant, adsorbent, flocculant, oxidizer, . . . ), the dosage, the dosing modes (continuous or intermittent), the dosing point, the mixing efficiency, temperature, properties of the foulants (hydrophobicity, charge density, molecular weight, and molecular size) and characteristics of the membrane (membrane charge, hydrophobicity, and surface morphology). Therefore, pretreatment methods are highly sensitive to the application conditions and need to be individually planned, optimized and monitored.

Conditioning by coagulation/flocculation is commonly used in conventional filtration technology (e.g., media filtration). The conditioning aims to prepare the liquid to be filtered to enable the correct functioning of the media filtration equipment by eliminating in particular the problems of media bed clogging and surface cake formation or filter blinding.

Although membrane technologies were originally designed as a higher performing and chemical-free alternative to conventional filtration technology, practical experience shows that various pretreatment processes (including physico-chemical processes) may be required to ensure stable membrane operation. Consequently, coagulation was adopted also as fouling control with a pretreatment of the water to be filtered through the membrane. A coagulation additive is added to the water to be filtered to promote the aggregation of foulants into larger flocs to reduce or eliminate blocking of the membrane pores. However, pin-sized flocs were deemed sufficient as the membrane pores are 2-3 orders of magnitude smaller than the pores in conventional filtration technology. Coagulants can be organic or mineral. Mineral coagulants are for example aluminum or iron salts. Coagulation is now the most widely used fouling control chemical in membrane-based water treatment systems. The coagulant acts here as the fouling control additive.

One problem of the coagulant is that unreacted coagulants can reach the membrane and react on the surface of the membrane or even in the membrane porous structure. Membranes may suffer from fiber plugging due to high coagulant use, or pore blocking by smaller monomers, dimers, and trimers of the hydrolyzing metal coagulant. So, the coagulant could become a source of fouling instead of solving the fouling. Fouling by $Fe^{2+}$ and $Mn^{2+}$ may also occur with coagulants of low grade. Fouling by iron requires a specifically tailored and intensive cleaning protocol to recover permeability. In addition, water generated from periodic membrane cleaning that contains the spent coagulant can have an environmental impact if disposed back directly to the environment without adequate treatment.

While the above-described pretreatment measures condition the water to be filtered to control the fouling, it is also known to condition the membrane. For example, WO2001027036A1 and WO2002044091A2 disclose a filtration aid which is added in each filter cycle into the water to be filtered for conditioning the membrane. The filtration aid added in the water to be filtered contains fouling control particles which form a deposit layer on the membrane due to the permeate flux. The deposit layer protects the membrane from fouling by retaining the foulants in the deposit layer. At the end of each cleaning cycle, the deposit layer with the retained foulants is cleaned from the membrane, e.g. by backwashing. Ion-exchange resin particles and suspensions of iron hydroxides, of aluminum oxides and hydroxides, of sintered iron oxide particles, of pulverized activated carbon, of clay particles and of other mineral particles are proposed as membrane fouling control additive. It is suggested to use fouling control particles with a size between 0.5 and 20 micrometer (μm). However, all materials suggested for the fouling control particles had severe side effects like being reactive, being abrasive, being toxic or environmentally not desirable which caused damages in the membrane, pumps and/or caused problems with the handling of the wastewater created by the cleaning. Consequently, this technology has not found application at industrial scale.

A similar system with the described membrane fouling control additive is also described in WO2017009792A1. In addition, it is suggested to have a stimuli responsive layer on the membrane and reactive fouling control particles such that the dynamic protective layer formed by the fouling control particles remains attached to the stimuli responsive layer even during the cleaning step until a stimulus is created with the stimuli responsive layer to remove the fouling control particles. It is suggested to use fouling control particles with a particle size smaller than 1 μm, preferably between 100 and 200 nm. This technology might lead to some reduced amount of fouling control particles needed. It did however not solve the problems of the fouling control particles proposed being reactive and/or abrasive and/or being environmentally not desirable. The stimuli responsive layer creates an additional process step associated with increased cost and complexity of the proposed solution, including waste handling and disposal.

BRIEF SUMMARY OF THE INVENTION

It is therefore the object of this invention to provide a system and a process for membrane fouling control as well as a fouling control additive which avoids the disadvantages of the state of the art and/or which is provided for an easy and efficient membrane fouling control.

According to the invention, this object is solved by a process for membrane fouling control comprising the steps of: Conducting/filtering a liquid to be filtered through a membrane; and adding fouling control particles upstream of the membrane and/or into the liquid to be filtered to form a dynamic protective layer on the membrane. The process is characterized by one or more of the subsequent embodiments.

Further, According to the invention, this object is also solved by a system for membrane fouling control comprising: a first conduct portion; a second conduct portion; a membrane arranged between the first conduct portion and the second conduct portion and/or configured to filter a liquid by conducting it from the first conduct portion to the second conduct portion; and a fouling control means filled with fouling control particles and/or configured for adding the fouling control particles in the first conduct portion, wherein the fouling control particles and/or the fouling control means is configured such that a dynamic protective layer is formed on the membrane by the fouling control particles added by the fouling control means for protecting the membrane from foulants. The system is characterized by one or more of the subsequent embodiments.

According to the invention, this object is further solved by a membrane fouling control additive comprising fouling control particles for forming a dynamic protective layer on a membrane for fouling control of the membrane, when added in the liquid flowing through the membrane. The membrane fouling control additive is characterized by one or more of the subsequent embodiments.

The process, system and/or additive is characterized by one or more of the following embodiments.

In one embodiment, the fouling control particles are precipitates, preferably mineral or metal precipitates. Precipitate particles, in particular the family of mineral precipitate particles and of metal precipitate particles allows to tune the properties of the fouling control particles like their size or size distribution during the manufacturing.

In one embodiment, the fouling control particles and/or the additive are/comprise minerals based on calcium and/or magnesium, preferably synthetic mineral precipitates based on calcium and/or magnesium. Preferred examples of this family are (precipitated) calcium carbonate and (precipitated) hydromagnesite. This is a versatile mineral-based material that can be tuned in terms of morphology, particle size and polydispersity to provide a range of functionalities for different applications. For the purpose of membrane fouling control, we found a surprisingly good effect with this material, whereby membrane permeability was nearly completely restored after each cleaning of the dynamic protective layer. In addition, this material is not detrimental to the membrane material or other system components (not abrasive, not corrosive) and does not pose an environmental hazard (can be disposed of with minimal handling). Ultrafine and/or microfine precipitated calcium carbonate or/and precipitated hydromagnesite is/are chemically inert and is/are able to form high porosity filter cakes that permit high initial liquid flow, provide pore space to trap and contain the foulants and do/does not adversely affect the membrane permeability. Particle size distribution of precipitates of this material can be tailored to create coating layers that provide highest flow rates through the membranes.

In one embodiment, the fouling control particles are composite particles (made of a composition) of a first material and a second material. The composite particles comprise preferably a core of the first material and a shell of the second material. The first material is preferably a mineral and/or a mineral precipitate, preferably a calcium-based mineral (precipitate), preferably a calcium carbonate, preferably mainly calcite with a minor portion of aragonite. The second material is preferably a mineral and/or a mineral precipitate, preferably a magnesium-based mineral (precipitate), preferably a hydromagnesite, preferably hydromagnesite with (some traces of) nesquehonite. These composite particles can be easily tuned in size based on the material of the core and/or of the first material and/or can be easily functionalized based on the material of the shell and/or of the second material. This allows to functionalize the dynamic protective layer, e.g. for improving the adhesion of the foulants to the dynamic protective layer, and thus further improve the filter function of the dynamic protective layer. The shell material has preferably different properties than the core material and would absorb different kind of foulants and to different surfaces. In addition, the shell material can be porous, allowing absorption into the pores, which keeps the spaces (pores) between the particles open. On the other side, this group of composite particles are environmentally much more compatible than the reactive fouling control particles used in the state of the art.

In one embodiment, the fouling control particles are inert. Within the meaning of the present invention, the term “inert” means that the fouling control particles do not change their properties in the dynamic protective layer on the membrane during the operation mode. In the state of the art, only reactive fouling control particles were suggested to react with the foulants. This has a negative effect on the environment and needs special waste treatment. Often the reactive fouling control particles are also aggressive to the membrane and other system equipment like pumps, e.g. abrasive or corrosive.

In one embodiment, the fouling control particles are reactive or functionalized. Within the meaning of the present invention, the terms “reactive or functionalized particles” means preferably that the surface of the fouling control particles have specific charges or groups which absorb foulants and/or which attach to the membrane surface.

In one embodiment, the fouling control particles and/or the additive have/has a polydispersity value greater than or equal to 0.1 and/or smaller than or equal to 1.5. Preferably, the polydispersity value is larger than or equal to 0.2, preferably larger than or equal to 0.3, preferably larger than or equal to 0.4, preferably larger than or equal to 0.5. Preferably, the polydispersity value is smaller than or equal to 1.4, preferably smaller than or equal to 1.2, preferably smaller than or equal to 1.1, preferably smaller than or equal to 1.0. Preferably, the ultrafine synthetic mineral particles have a polydispersity value comprised in the range 0.3 to 1.2, preferably between 0.5 to 1.0. Preferably, the microfine synthetic mineral particles have a polydispersity value comprised in the range 0.7 to 1.5, preferably between 0.9 to 1.3. The polydispersity value of the synthetic mineral precipitate particles according to the present invention allows to characterize the distribution width (also sometimes referred to a certain polydispersity of the population of the particles in the mineral precipitate particles) considered between the particle size $d_{90}$ and $d_{10}$ divided by the $d_{50}$ particle size. This polydispersity value of the fouling control particles is preferably larger than or equal to 0.1, preferably larger than or equal to 0.15, preferably larger than or equal to 0.2. The polydispersity value of the fouling control particles is preferably smaller than or equal to 1.5, preferably smaller than or equal to 1.2, preferably smaller than or equal to 1.0, preferably smaller than or equal to 0.8, preferably smaller than or equal to 0.6, preferably smaller than or equal to 0.4, preferably smaller than or equal to 0.35, preferably smaller than or equal to 0.3, preferably smaller than or equal to 0.25. By the terms “polydispersity value”, it is meant, within the meaning of the present invention the distribution width between $d_{90}$ and $d_{10}$ divided by the $d_{50}$. The polydispersity value is calculated according to the formula below:

$$\text{polydispersity value} = \frac{d90 - d10}{d50},$$

where $d_{90}$, $d_{10}$, $d_{50}$ values are the $d_{90}$, $d_{10}$, $d_{50}$ of the fouling control particles. As defined above, the $d_{90}$, $d_{10}$, $d_{50}$ are obtained from number-based distributions and/or from the laser diffraction as defined below. Such polydispersity value obtained from number-based distributions is used to characterize the narrow particle size distribution of the synthetic mineral precipitate particles according to the present invention and is disclosed in literature. It has indeed been realized that the polydispersity value plays a significant role in the formation of the dynamic protective layer by fouling control particles, because of the risk of pore blockage by too fine fouling control particles on the one hand and poor and inhomogeneous membrane coverage by large fouling control particles on the other hand In one embodiment, the fouling control particles have an absolute value of the zeta potential smaller than 50 mV, preferably than 45 mV, preferably than 40 mV. This has the advantage that the fouling control particles can form a sacrificial layer, i.e. a layer that can be easily detached from the membrane. In one embodiment particles have a positive zeta potential smaller than 50 mV, preferably than 45 mV, preferably than 40 mV. In another embodiment, the particles have a negative zeta potential greater than −50 mV, preferably than −45 mV, preferably than −40 mV.

According to the present invention, the zeta potential of the particles was measured according to the following experimental procedure. The suspensions of synthetic mineral precipitate particles have been subjected to a magnetic agitation for 30 minutes, before each zeta potential measurements. The suspensions have been then subjected to a dispersion step during 30 seconds with an ultrasound sonication probe Hielscher-UP4005 (with an amplitude of 50% and a cycle of 0.5) followed by a further magnetic agitation during 30 minutes before a new series of measurements. The zeta potential measurements have been performed with electroacoustic spectrometer DT-1200 (Dispersion Technology). The electroacoustic probe for measuring the zeta potential was calibrated with a colloidal silica suspension showing a zeta potential of −38 (±1) mV. For each sample, five zeta potential measurements are realized.

In one embodiment, the fouling control particles have a specific surface area measured by nitrogen adsorption manometry and calculated according to the BET method larger than 10 $m^2/g$, preferably than 15 $m^2/g$, preferably larger than or equal to 20 $m^2/g$. This results in a better deposition on the membrane surface as well as larger affinity for foulants capture from the liquid to be filtered.

In one embodiment, the Scherrer diameter of the fouling control particles are larger than 20 nm, preferably than 30 nm, preferably than 40 nm, preferably than 50 nm, preferably than 60 nm. In one embodiment, the Scherrer diameter of the fouling control particles are smaller than 150 nm, preferably than 140 nm, preferably than 130 nm, preferably than 120 nm, preferably than 110 nm, preferably than 100 nm. Preferably, the Scherrer diameter of the fouling control particles are between 50 nm and 100 nm. The Scherrer diameter indicates the mean size of the ordered (crystalline) domains and is calculated according to the Scherrer equation, preferably based on measurements with X-ray diffraction.

X-ray powder diffraction (XRD) is an analytical technique used for phase identification and crystals size (Scherrer Diameter) of a crystalline material. Diffraction is based on generation of X-rays in an X-ray tube. These X-rays are filtered and collimated in order to produce a concentrated monochromatic radiation, which is directed towards the sample. This analysis is performed using a Bruker-D8 advance instrument. Copper K-a is an x-ray energy frequently used on lab-scale x-ray instruments. The energy is 8.04 keV, which corresponds to an x-ray wavelength of 1.5406 Å.

In crystalline materials, the scattered X-rays undergo constructive and destructive interferences. This process of diffraction is described by Bragg's Law ($n\lambda=2d \sin \theta$). The diffracted X-rays are detected, processed, and counted.

As the directions of possible diffractions depend on the size and shape of the crystals composing the sample and the intensities of the diffracted waves depend on the kind and arrangement of atoms in the crystal structure, this method enables to determine the chemical composition of a sample. By applying Scherrer's equation to peak broadening for a crystal structure, it is also possible to determine the size of crystals in the sample.

Typically, we would use the Lorentz fit (for the diffraction peak) to calculate the Scherrer diameter and we apply this to the peaks at ca. 29.45°, 39.46° and 43.21° of the diffraction pattern.

In one embodiment, the fouling control particles and/or the additive is under the form of a slurry with a solids content and/or a fouling control particles content preferably lower than or equal to 20 wt %, preferably lower than or equal to 15 wt %, preferably lower than or equal to 12 wt %, preferably lower than or equal to 11 wt %, preferably lower than or equal to 10 wt %. In one embodiment, the fouling control particles and/or the additive is in a form of a slurry with a solids content and/or a fouling control particles content preferably greater than or equal to 1 wt %, preferably greater than or equal to 1.5 wt %, preferably greater than or equal to 3 wt %, preferably greater than or equal to 5 wt %, preferably greater than or equal to 6 wt %, preferably greater than or equal to 7 wt %. The higher the solid content of the fouling control particles, the less volume and weight the additive and/or the fouling control particles require for storage and transport.

In one embodiment, the $d_{10}$ of the size distribution of the fouling control particles is larger than a defined pore size of the membrane. Preferably, the $d_{10}$ of the size distribution of the fouling control particles is 3 times, preferably five times, preferably seven times preferably nine times, preferably ten times larger than the defined pore size. It is shown that the selection of the lower size limit of the fouling control particles dependent on the defined pore size of the membrane increases significantly the performance of the fouling control method. The fouling control particles are selected larger than the defined pore size of the membrane so that the fouling control particles cannot enter the membrane and the narrowing of the pores of the membrane is avoided. This explains likely the positive effect of this measure. In the state of the art, only the average particle size was controlled and the average particle size was not selected depending on the membrane defined pore size. This explains the limited performances of the membrane fouling control by the fouling control particles forming a dynamic protective layer on the membrane of the state of the art. In addition, the fact that only the average particle size was controlled neglected the often very large size distributions of the fouling control particles in those small dimensions which lead for average particle sizes above the defined pore size still to a large amount of fouling control particles below the defined pore size leading therefore still to a narrowing of the pores. This measure is particularly advantageous with the subsequent embodiment.

In one embodiment, the $d_{90}$ of the size distribution of the fouling control particles is lower than or equal to 15 μm, preferably lower than or equal to 10 μm, preferably lower than or equal to 5 μm, preferably lower than or equal to 1 μm, preferably lower than or equal to 0.7 μm, preferably lower than or equal to 0.5 μm. It is shown that the main influence of the upper size limit of the fouling control particles for the performance of the fouling control method is the homogeneity of the deposition of the fouling control particles. The homogeneity depends mainly on the absolute particle size and less on the dependence on the defined pore size of the membrane. The above-mentioned upper size limits have been proved to significantly reduce the heterogeneity of the deposited fouling control particles leading thus to a high performance dynamic protective layer on the membrane. As already mentioned above, it was further found out that it is not only important to select the average particle size, but more important to select the $d_{90}$ of the size distribution of the fouling control particles. There might be also some effects of the upper limit of the particle size which depend on the defined pore size like full blocking of the pores. However, it was shown that these defined pore size dependent effects have a reduced influence compared to the mentioned homogeneity which depends on the absolute size of the particles.

In a preferred embodiment, the $d_{10}$ of the size distribution of the fouling control particles is chosen depending on the defined pore size, while the $d_{90}$ of the size distribution of the fouling control particles is chosen as an absolute value. This combination significantly improved the performance of the membrane fouling control compared to the ones known in the state of the art.

In one embodiment, the $d_{10}$ of the size distribution of the fouling control particles is greater than or equal 50 nm, preferably greater than or equal to 70 nm, preferably greater than or equal to 100 nm, preferably greater than or equal to 200 nm.

In one embodiment, the membrane fouling control additive and/or the fouling control particles is/are characterized in that the particles comprise synthetic mineral precipitate particles based on calcium and/or magnesium chosen amongst ultrafine synthetic mineral precipitate particles and microfine synthetic mineral precipitate particles, wherein the ultrafine synthetic mineral precipitate particles are based on calcium and/or magnesium having a particle size distribution $d_{50}$ lower than or equal to 1 μm, $d_{90}$ lower than or equal to 10 μm and a $d_{10}$ comprised between 50 nm and 500 nm, and wherein the microfine synthetic mineral precipitate particles are based on calcium and/or magnesium having a particle size distribution $d_{50}$ lower than or equal to 5 μm, $d_{90}$ lower than or equal to 15 μm and a $d_{10}$ comprised between 200 nm and 3 μm. Accordingly, the additive according to this embodiment is a synthetic mineral precipitate based on calcium and/or magnesium having strictly controlled particle size distribution showing adequacy with the membrane fouling control application in that the membrane permeability was nearly completely restored after each cleaning of the dynamic protective layer while not being detrimental to the membrane. The calcium and/or magnesium additive according to this embodiment is able to permit high initial liquid flow, provide pore space to trap and contain the foulants and do/does not adversely affect the membrane permeability, especially due to the fact that the particle size distribution of synthetic mineral precipitate based on calcium and/or magnesium is tailored to create coating layers that provide highest flow rates through the membranes but also having properties at the layer level.

According to the present invention, the particle size distribution (PSD) is measured according to the standard ISO13320:2020(E), item 5 by laser light scattering (commonly also called laser diffraction) of the fouling control particles dispersed in water. Preferably, the PSD is analyzed/measured for the range smaller than 0.4 μm by laser light scattering using light at 450 nm, 600 nm, 900 nm with two polarizations for each wavelength and for the range equal to and larger than 0.4 μm by a laser of 780 nm wavelength. The PSD is generated by a Mie Diffraction model, according to the standard ISO13320:2020(E), item 5. Water is used as dispersion liquid. Sonication is used to reach complete dispersion of the fouling control particles in the water before the measurement with the laser diffraction. In the used measurement method for obtaining the PSD below 0.4 μm, a white light emitting diode (LED) is used with three different filters to obtain the light measurement at the three wavelengths 450 nm, 600 nm, 900 nm and with two polarizers to obtain for each of the three wavelengths two (orthogonal) polarizations (resulting in a total of six light measurements). In the used measurement method for obtaining the PSD at and above 0.4 μm, laser light at 780 nm (red laser) is used. For the red laser, no polarizers are used. The PSD for the range below 0.4 μm is generated by the Mie Diffraction model based on the six measurements resulting from the three wavelength measurements at 450 nm, 600 nm, 900 nm each measured with two orthogonal polarizations. The PSD for the range at and above 0.4 μm is generated by the Mie Diffraction model based on the measurement with the red laser.

The values $d_y$ of a particle size distribution, as explained below, refers to the size at which y % of the distribution is below the size $d_y$. The values $d_y$ in this application refer to a number-based particle size distribution meaning that y % of the number of particles are below $d_y$ and/or (100%−y %) of the number of particles are above $d_y$ (neglecting the particles exactly at $d_y$). The values $d_y$ of a particle size distribution are determined from the PSD determined by laser light scattering as explained above.

Synthetic mineral precipitate based on calcium and/or magnesium are mineral precipitates for which the manufacturing is controlled to reach specific feature in the synthetic precipitate such as the particle size distribution, the BJH porosity and BET specific surface area. Such synthetic mineral precipitate distinguishes typically over naturally occurring mineral precipitate by the constraints applied during the manufacturing process yielding typically to a narrower particle size distribution for the synthetic mineral precipitate since the process is controlled while naturally occurring mineral precipitate have typically a very broad particle size distribution since crystallization is not performed under constraints and most often quite slow.

Synthetic mineral precipitates are for example disclosed in US20150044469 or in US20180170765.

In one embodiment, depending on the microfiltration membrane, the $d_{90}$ of the size distribution of the fouling control particles is lower than or equal to 15 μm, preferably lower than or equal to 10 μm, preferably lower than or equal to 5 μm, preferably lower than or equal to 1 μm, preferably lower than or equal to 0.7 μm, preferably lower than or equal to 0.5 μm.

In one embodiment, depending on the ultrafiltration membrane, the $d_{90}$ of the size distribution of the fouling control particles is lower than or equal to 10 μm, preferably lower than or equal to 5 μm, preferably lower than or equal to 1 μm, preferably lower than or equal to 0.7 μm, preferably lower than or equal to 0.5 μm.

In one embodiment, the $d_{10}$ of the particle size distribution of the fouling control particles for ultrafiltration is lower than or equal to 500 nm, preferably lower than or equal to 400 nm, preferably lower than or equal to 350 nm, preferably greater than or equal to 320 nm.

In one embodiment, the $d_{10}$ of the particle size distribution of the fouling control particles for microfiltration is greater than or equal to 200 nm, preferably greater than or equal to 250 nm, preferably greater than or equal to 300 nm, preferably greater than or equal to 500 nm.

In one embodiment, the $d_{10}$ of the particle size distribution of the fouling control particles for microfiltration is lower than or equal to 1000 nm, preferably lower than or equal to 900 nm, preferably lower than or equal to 800 nm, preferably lower than or equal to 750 nm.

In one embodiment, the process comprises the further step of forming the fouling control particles in situ and/or the fouling control means comprises a fouling control particle forming means for forming the fouling control particles in situ or in the fouling control means. The fouling control particles are preferably formed before adding the fouling control particles into the liquid to be filtered.

The fouling control particles are preferably formed by a physical action and/or a chemical reaction. The chemical reaction uses preferably at least one raw material or substance, preferably at least two raw material or substances to obtain by the chemical reaction the fouling control particles. The chemical reaction is preferably a precipitation. The chemical reaction is preferably a carbonation, preferably a carbonation of calcium hydroxide and/or magnesium hydroxide. Preferably, precipitated calcium carbonate is obtained by the chemical reaction. By producing the fouling control particles in situ, some stability problems of the size distribution of some fouling control particles can be reduced, the raw materials used for the chemical reaction might be easier to handle and process. The physical action can be a size reduction action and/or a classification.

In one embodiment, in the process according to the present invention, the dynamic protective layer is formed directly against the membrane.

In one embodiment, in the process according to the present invention, the dynamic protective layer formed on the membrane is a porous layer which allows the liquid to pass through to the membrane and which retains the foulants.

In one embodiment, in the process according to the present invention, the dynamic protective layer is formed and/or maintained on the membrane by a transmembrane pressure generated across the membrane as a result of conducting the liquid to be filtered through the membrane and/or by the permeate flux, i.e. by the permeation drag or the hydraulic force that transports the particles to the membrane surface.

In one embodiment, the process according to the present invention comprises the further step of and/or the system according to the present invention is configured for cleaning the dynamic protective layer with the filtered/retained foulants from the membrane.

In one embodiment, the process according to the present invention performs a plurality of filter cycles and/or the system according to the present invention is configured to perform a plurality of filter cycles. One or more or all filter cycles of the plurality of filter cycles comprise:

Adding the fouling control particles into the liquid to be filtered for forming the dynamic protective layer on the membrane;

filtering the liquid to be filtered conducted through the membrane while the foulants are retained by the dynamic protective layer; and cleaning the dynamic protective layer with the retained foulants from the membrane.

In one embodiment, the membrane of the process according to the present invention and/or of the system according to the present invention is a microfiltration membrane or ultrafiltration membrane In one embodiment, in the process according to the present invention, said liquid conducted through the membrane is an aqueous liquid, preferably municipal wastewater, seawater, industrial process water and industrial wastewater, source water for municipal drinking water, brackish water, fresh ground water, fresh surface water.

In one embodiment, in the process according to the present invention, the fouling control particles added into the liquid to be filtered are forming a dynamic protective layer on the membrane such that, when the liquid to be filtered contains foulants, the foulants are retained in the dynamic protective layer before the liquid to be filtered is conducted through the membrane.

Other embodiments according to the present invention are mentioned in the appended claims, the subsequent description of

BRIEF DESCRIPTION OF THE DRAWINGS

FIG. 5 shows a step of the method for fouling control of cleaning the dynamic protective layer from the membrane.

FIG. 6 shows an embodiment of a size distribution of the fouling control particles.

FIG. 7 shows an idealized membrane with the fouling control particles of a first size.

FIG. 8 shows the idealized membrane with the fouling control particles of a second size.

FIG. 9 shows the pressure over different filtration cycles for a membrane fouling control using coagulants.

FIG. 10 shows the pressure over different filtration cycles for a membrane fouling control using precipitated calcium carbonate as fouling control particles.

FIG. 11 show a translation table for the defined pore size and the MWCO.

FIG. 12 shows the pressure over different filtration cycles for a membrane fouling control once using precipitated calcium carbonate as fouling control particles and once using no fouling control particles.

In the drawings, the same reference numbers have been allocated to the same or analogue element.

DETAILED DESCRIPTION OF AN EMBODIMENT OF THE INVENTION

Other characteristics and advantages of the present invention will be derived from the non-limitative following description, and by making reference to the drawings and the examples.

Figure 1:
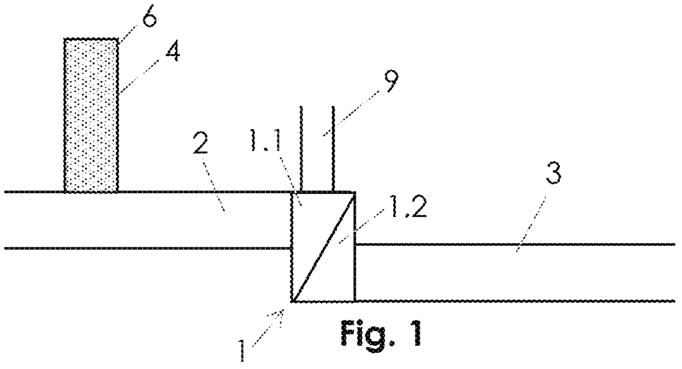
FIG. 1 shows a system for fouling control.

FIG. 1 shows a system for membrane fouling control comprising a membrane 1, a first conduct portion 2, a second conduct portion 3 and a fouling control means 4. Preferably, the system comprises further a cleaning outlet 9 and/or cleaning outlet control means.

The system for membrane fouling control is configured to filter a liquid to be filtered through a membrane 1 to obtain a filtered liquid while controlling the fouling of the membrane 1. The application of the system for membrane fouling control can be in municipal drinking water applications, municipal wastewater applications, applications for desalination or reuse of water, applications for industrial wastewater like oily waters, sludge, waters with chemical substances, etc. However also in industrial process water like in the beverage industry the present system can be applied.

The liquid to be filtered is the liquid in the first conduct portion 2 or the liquid which is in the operation mode upstream of the membrane 1. The filtered liquid is the liquid in the second conduct portion 3 or the liquid which is downstream of the membrane 1 in the operation mode. The filtered liquid obtained by the liquid to be filtered conducted through the membrane 1 is also called the permeate. The liquid to be filtered and the filtered liquid is normally a water-based liquid (aqueous liquid). However, it is also possible that the liquid to be filtered is not a water-based liquid, but another liquid.

The liquid to be filtered is normally a liquid including contaminants (contaminated liquid). The contaminants are intended to be filtered out by the membrane 1. The filtered liquid is the liquid with a reduced amount of contaminants, preferably substantially depleted from the contaminants. Of course, it is also possible that the liquid to be filtered is a clean liquid, i.e. a liquid without contaminants. This can be for certain operation modes or because simply the liquid to be filtered is not always contaminated. The liquid to be filtered is normally a water-based liquid (aqueous liquid), i.e. a contaminated water or water with contaminants and the filtered liquid is normally a clean water or a water with a reduced amount of contaminants, preferably free of contaminants. The contaminated water could be a water source for municipal drinking water and/or the filtered liquid could be the municipal drinking water or a pre-processed municipal drinking water. The contaminated water could be a wastewater, like municipal wastewater with biological or other contaminants or like industrial wastewater with chemical, mineral or other contaminants, or like sludge and/or the filtered water could be filtered wastewater or clean water. The contaminated water could be salt or seawater with the contaminants being salts, minerals and/or biological contaminants. The contaminated water could be industrial process water.

The contaminants are normally undesired particles in the liquid to be filtered and the filtered liquid (also called permeate) is the desired product of the membrane process. However, in some applications, the contaminants retained by the membrane 1 or the retentate, i.e. the liquid with the retained contaminants, could be the desired product of the process. The contaminants are preferably particles which can and/or should be retained by the membrane 1.

The liquid to be filtered contains further foulants 10. Foulants are contaminants which create membrane fouling. The foulants can be in a solid form (fouling particles) in the liquid to be filtered and/or can be in a dissolved form in the liquid to be filtered. Different types of foulants 10 and different types of membrane fouling were already described in the introduction and are not repeated here. All or some foulants 10 can be contaminants. All or some contaminants can be foulants 10. This depends on the application, the liquid to be filtered, the membrane 1 and the process conditions. The subsequent description focuses mainly on the foulants 10 without specifying, if the foulants are contaminants or not.

The membrane 1 is configured to filter contaminants out of the liquid to be filtered to obtain the filtered liquid, when the liquid to be filtered traverses the membrane 1. The filtering of the contaminants means that the amount of contaminants in the filtered liquid is smaller than the amount of contaminants in the liquid to be filtered, preferably reduced by more than 50%, preferably by more than 60%, preferably more than 80%, preferably more than 90%. Most preferably all contaminants are retained by the membrane 1, when the liquid to be filtered traverses the membrane 1. The membrane 1 has a first side 1.1 and a second side 1.2. The first side 1.1 is connected with the second side 1.2 through pores 5 of the membrane 1. The first side 1.1 provides the membrane surface of the membrane 1. The first side 1.1 or the membrane surface is provided depending on the design of the membrane 1 by tubes, hollow fibers or other geometries.

The membrane 1 has preferably a defined pore size defining the retaining capability of a membrane 1. The defined pore size is a value resulting from the pore size distribution of the pores of the membrane 1 and/or resulting from the particle size for which particles with this particle size are retained at a certain percentage X %. An example of a pore size resulting from the pore size distribution is the pore size most common in the distribution or the average pore size or the $d_{90}$ of the pore size distribution. $d_z$ of a size distribution refers to the size at which % of the distribution is below the size $d_z$. In some membranes 1, the defined pore size of a membrane 1 refers to a particle size for which the particles are retained by the membrane 1 (with a certain likelihood). The defined pore size of a membrane 1 refers preferably to a particle size at which X % of the particles of this particle size are retained. The percentage X is preferably larger than or equal to 50%, preferably larger than 60%, preferably than 70%, preferably than 80%. A preferred definition of the defined pore size is X being 90%. Some membranes 1 define the defined pore size as a molecular weight cut-off (MWCO) with units in Dalton (Da). It is defined as the minimum molecular weight of a globular molecule that is retained to 90% by the membrane 1. The MWCO can be converted for the purpose of the invention to the defined pore size according to the table shown in FIG. 11. The second column shows the MWCO in kilo Dalton (kDA) and the first column show the corresponding translated defined pore sizes in nanometer (nm). The third column shows the corresponding type of the membrane: Reverse osmosis, nanofiltration, ultrafiltration and microfiltration. Any MWCO value of a membrane 1 can be translated into its corresponding defined pore size of the membrane 1 according to the invention by a linear interpolation of the next bigger MWCO value and the next smaller MWCO value. This translation method might not always be very precise, but is sufficient for the current invention to define clearly a defined pore size of a membrane 1 based on its MWCO value, if the membrane 1 is defined by its MWCO value instead of its pore size.

The invention is particularly advantageous for membranes 1 with pore sizes larger than 5 nm, preferably larger than 10 nm, preferably larger than 50 nm, in some embodiments larger than 100 nm. The invention is particularly advantageous for membranes 1 with pore sizes smaller than 50 μm, preferably smaller than 20 μm. The membrane 1 is preferably a microfiltration membrane or an ultrafiltration membrane. A microfiltration membrane is considered a membrane with a pore size between 150 nm and 20 μm. An ultrafiltration membrane is considered a membrane with a pore size between 5 nm and 150 nm. However, the invention is not limited to those pore sizes and could also be applied to other membrane types, maybe larger nanofiltration membrane pore sizes. In a preferred embodiment, the membrane 1 is not suitable for removing monovalent and/or divalent ions.

The membrane 1 can be any membrane type like monoliths, tubular, flat sheet (plate, frame or spiral wound), hollow fiber or any other membrane type. The membrane 1 can be of any material like ceramics, polymers or others. The membrane 1 shown in FIG. 1 is arranged in a dead-end configuration. The membrane 1 can however also be arranged in a cross-filtration configuration. The membrane works preferably with a low-pressure membrane technology.

The first conduct portion 2 is configured to store or conduct the liquid to be filtered such that it can be conducted through the membrane 1. The first conduct portion 2 has therefore a contact surface with the first side 1.1 of the membrane 1. The first conduct portion 2 can be a vessel, a tube, a tank or any other liquid storing or conduct means. The first conduct portion 2 can comprise a pump to create a transmembrane pressure between the first side 1.1 of the membrane 1 and the second side 1.2 of the membrane 2 and/or to transport the liquid to be filtered to the membrane 1 and/or to create a hydraulic force that transports the liquid to be filtered to the membrane surface. The created liquid flow is preferably perpendicular to the membrane surface. The transmembrane pressure is the resultant pressure formed in the system from the flow through the membrane according to Darcy's law. The first side 1.1 and second side 1.2 of the membrane 1 are not necessarily in geometrical terms, but rather in functional terms of the membrane 1.

The second conduct portion 3 is configured to store or conduct the filtered liquid. The liquid to be filtered flows thus through the membrane 1 to become the filtered liquid and enters the second conduct portion 3. The second conduct portion 3 has therefore a contact surface with the second side 1.2 of the membrane 1. The second conduct portion 3 can be a vessel, a tube, a tank or any other liquid storing or conducting means. The second conduct portion 3 can comprise a pump to transport the filtered liquid away from the membrane 1 and/or to create a transmembrane pressure between the first side 1.1 of the membrane 1 and the second side 1.2 of the membrane 1.

The system or the first conduct portion 2, the membrane 1 and/or the second conduct portion 3 is/are preferably configured (in the operation mode) to create a transmembrane pressure or liquid flow which conducts the liquid to be filtered from the first conduct portion 2 through the membrane 1 to the second conduct portion 3 to become the filtered liquid. The transmembrane pressure or the liquid flow can be achieved by a pump in the first conduct portion 2 or in the second conduct portion 3. The transmembrane pressure or the liquid flow can also be created by gravity or by any other force on the liquid. The transmembrane pressure is physically related to the liquid flow from the first conduct portion 2 through the membrane 1 to the second conduct portion 3. If there is liquid flow, there is also a transmembrane pressure and vice versa. Thus, the creation of a transmembrane pressure is equivalent with the creation of a liquid flow and vice versa. For a given liquid flow, the transmembrane pressure depends on the resistance created by the membrane and the fouling of the membrane (or by other factors). The system can be operated for example with a constant liquid flow. In this case, the transmembrane pressure (in the operation mode) increases with the time due to the fouling of the membrane 1 as shown for example in FIG. 9. The system can however also be operated with a constant transmembrane pressure. In this case, the liquid flow will decrease with the time due to the fouling of the membrane 1.

In some embodiment, the system or the first conduct portion 2, the membrane 1 and/or the second conduct portion 3 is/are preferably configured (e.g. in the cleaning mode) to create a reverse transmembrane pressure or a reverse liquid flow which conducts the filtered liquid or the liquid in the second conduct portion 2 through the membrane 1 into the first conduct portion 2. This reverse transmembrane pressure or reverse liquid flow can be applied in a cleaning mode to create a backwash of the membrane 1 to clean the membrane 1 from a dynamic protective layer 7, fouling control particles 6 and/or foulants. It is distinguished between a hydraulic backwash (without chemical additives) and a chemically enhanced backwash with chemical additives in the liquid used to backwash the membrane 1. When the liquid flow gets too low or when the transmembrane pressure gets too high, a cleaning mode is applied to remove the fouling and reduce the resistance created by the fouling.

A filter cycle comprises an operating mode and a cleaning mode. The cleaning mode of the filter cycle comprises preferably a hydraulic backwash. A filter cycle follows the other so that a cleaning mode follows the operation mode and an operation mode follows the cleaning mode etc.

Since the hydraulic backwash might not completely remove the fouling, a chemical cleaning mode with a chemically enhanced backwash might be necessary after a plurality of filter cycles to remove the fouling which was not removed by the hydraulic backwash.

The operation mode and the cleaning mode might have a fixed length. However, it is also possible to sense a parameter indicating the fouling of the membrane to determine the length/end of the operation mode and/or of the cleaning mode. Also the chemical cleaning mode might be triggered by a fixed number of filter cycles or a fixed duration. However, it is also possible to sense a parameter indicating the fouling of the membrane to determine the length/end of the operation mode and/or of the cleaning mode. The parameter indicating the fouling might be a parameter indicating the transmembrane pressure (when the system is operated with a constant liquid flow) or a parameter indicating the liquid flow (when the system is operated with a constant transmembrane pressure) or a parameter depending on one or two of the liquid flow and the transmembrane pressure. The permeability depending on transmembrane pressure and the liquid flow is for example a good parameter for such a control.

The fouling control means 4 is configured to add fouling control particles 6 and/or a membrane fouling control additive into the liquid to be filtered and/or into the first conduct portion 2. The fouling control means 4 comprises preferably a container or vessel for storing the fouling control particles 6 and/or the membrane fouling control additive. The fouling control means 4 comprises an opening or a connection towards the first conduct portion 2 for adding the fouling control particles 6 and/or the membrane fouling control additive into the liquid to be filtered and/or into the first conduct portion 2. The opening or connection can preferably be opened and closed to control the amount of opening or a connection towards the first conduct portion 2 for adding the fouling control particles 6 and/or the membrane fouling control additive added. Preferably, the fouling control means 4 contains the fouling control particles 6 and/or the membrane fouling control additive.

The membrane fouling control additive is an additive to prevent or control membrane fouling by conditioning the membrane, in particular by forming a dynamic protective layer 7 of fouling control particles 6 on the membrane 1. The membrane fouling control additive is an additive added during the operation mode of the system/method (not during the cleaning mode). The membrane fouling control additive comprises the fouling control particles 6. The fouling control particles 6 are configured to form the dynamic protective layer 7 on the membrane 1, when the fouling control particles 6 are added in the liquid to be filtered.

The membrane fouling control additive and/or the fouling control particles 6 are preferably in a form of a slurry. The slurry contains preferably a liquid, preferably water, and solid particles (solids). The solids comprise the fouling control particles 6, preferably consist of at least 50 wt % fouling control particles, preferably of at least 60 wt % fouling control particles, preferably of at least 70 wt % fouling control particles, preferably of at least 80 wt % fouling control particles, preferably of at least 90 wt % fouling control particles. Most preferably, the solids are the fouling control particles 6. The solids content and/or the fouling control particles 6 content of the slurry is preferably smaller than 20 weight percent (wt %), preferably smaller than 15 wt %, preferably smaller than 12 wt %. The solids content and/or the fouling control particles 6 content of the slurry is preferably larger than 1 wt %, preferably larger than 2 wt %, preferably larger than 4 wt %, preferably larger than 5 wt %, preferably larger than 6 wt %, preferably larger than 7 wt %.

In an alternative embodiment, the membrane fouling control additive and/or the fouling control particles 6 are carried to the fouling control means 4, filled into the fouling control means 4, stored in the fouling control means 4 and/or added into the first conduct portion 2 and/or the liquid to be filtered in a dry formulation, i.e. as a powder. It is also possible to mix this powder with a liquid to obtain a slurry between one of the mentioned steps, e.g. before or when filling the powder into the fouling control means 4 to add the membrane fouling control additive and/or the fouling control particles 6 as a slurry into the first conduct portion 2 and/or the liquid to be filtered.

In the above-described embodiment, the membrane fouling control additive and/or the fouling control particles 6 are filled in the fouling control means 4 in the same form as they are entered in the first conduct portion 2 and/or into the liquid to be filtered. In an alternative embodiment, one or more raw materials are added to the fouling control means 4 to obtain the membrane fouling control additive and/or the fouling control particles 6 as entered in the first conduct portion 2 and/or into the liquid to be filtered. This can be simply a mixing step for example to mix the membrane fouling control additive and/or the fouling control particles 6 as a powder with a liquid to obtain the above-mentioned membrane fouling control additive and/or the fouling control particles 6 as a slurry.

In one embodiment, the membrane fouling control additive contains the fouling control particles 6 and a dispersant. The dispersant keeps the fouling control particles 6 from agglomerating. The dispersant can be polyether-polycarboxylate dispersants, polyacrylate dispersants or other dispersants.

In one embodiment, fouling control means 4 comprises a fouling control particles manufacturing device for forming the fouling control particles 6 or the membrane fouling control additive in situ by a chemical reaction. Thus, one or more raw materials are inserted in the fouling control means 4, in particular in the fouling control particles manufacturing device to obtain in situ by the chemical reaction the membrane fouling control additive and/or the fouling control particles 6. The membrane fouling control additive and/or the fouling control particles 6 are further fed into the first conduct portion 2 and/or the liquid to be filtered. Preferably, the chemical reaction comprises a gas-liquid reaction. Preferably, the chemical reaction comprises a precipitation to obtain synthetic precipitate particles as fouling control particles.

Preferably, the chemical reaction and/or the precipitation is a carbonation. The result of the carbonation is preferably a synthetic mineral precipitate. The chemical reaction is preferably realized by introducing gaseous carbon dioxide to a milk of calcium/magnesium hydrates under controlled conditions to obtain the final fouling control particles. Like this a synthetic mineral precipitate can be manufactured. The controlled conditions comprise the flow rates of the carbon dioxide, the temperature, the pressure and/or other conditions. The fouling control particles 6 and/or the additive can be manufactured before adding them into the fluid to be filtered.

One embodiment to manufacture for example precipitated calcium carbonate in situ will be described. In the fouling control particles manufacturing device, a milk of lime (slaked lime or calcium dihydrate) having a solid content comprised between 1 and 15 wt % is set at a temperature of 0 to 20° C. A gas mixture containing gaseous carbon dioxide with a volume fraction of 5 to 40% vol is injected under pressure of 0.1 to 0.5 MPa at a gas flow rate comprised between 1 and 5 (normal) ltr $CO_2$/min/ltr suspension. The feed of gaseous carbon dioxide is stopped when a pH of 8.3 or lower is obtained. The resulting suspension comprises at least a precipitated calcium carbonate content of 5 to 20% wt with respect to the total weight of the slurry and a precipitated calcium carbonate content with respect to the total solid content of 95% wt. The resulting suspension is a slurry of fouling control particles which is then further fed in the first conduit 2.

The system is preferably configured to operate in different modes. Preferably, the system comprises a control unit configured to operate the system in different modes. The control unit can comprise control means configured to control the specific parameters for the present method of fouling control in a filtration system. The control means can be added to the system and/or to the control unit to upgrade an existing filtration system to the inventive fouling control system as will be described in more detail. The control means can be a replacement control unit and/or can be an additional control unit added to the system and/or can be a plurality of additional control units. The control means can also be a software program, like a firmware update to upgrade an existing control unit to the method of the present invention.

In the operation mode, a transmembrane pressure is created over the membrane 1 and/or a liquid flow of the liquid to be filtered is created from the first conduct portion 2 through the membrane 1 into the second conduct portion 3 to obtain the filtered liquid.

In a cleaning mode, the membrane 1 is cleaned from the dynamic protective layer 7, fouling control particles 6 and/or foulants 10. Preferably, the cleaning is realized by a backwash (also called backflush), i.e. the transmembrane pressure and/or the flow direction over the membrane 1 is inverted. Preferably, the filtered liquid is conducted back through the membrane 1 to clean the membrane 1. However, it is also possible to use different cleaning mechanisms for cleaning the membrane 1 from the dynamic protective layer 7, fouling control particles 6 and/or foulants 10. This could be other cleaning mechanisms as the ones mentioned in the introduction. Preferably, the cleaning outlet 9 is opened during the cleaning mode to conduct the cleaning liquid comprising the dynamic protective layer 7, fouling control particles 6 and/or foulants 10 through the cleaning outlet 9 out of the first conduct portion 2. The cleaning outlet control means preferably closes the membrane 1 from the source of the liquid to be filtered so that the liquid to be filtered is not polluted even more. The cleaning outlet control means is preferably configured to close the cleaning outlet 9 during the operation mode. This allows to operate the membrane 1 in a dead-end configuration in the operation mode. However, in another embodiment it is also possible to conduct the cleaning liquid in the cleaning mode back into the first conduct portion 2. In this case, the cleaning outlet 9 and the cleaning outlet control means are not necessary.

The system is preferably configured to run or execute one or more (or different) filter cycles. Preferably, the control unit/means is configured to execute the one or more filter cycles. Each filter cycle comprises an operation mode and a cleaning mode.

Preferably, the system comprises preferably a liquid flow means configured (e.g. in the operation mode) to create the transmembrane pressure between the first side 1.1 of the membrane 1 (or the first conduct portion 2) and the second side 1.2 of the membrane 2 (or the second conduct portion 3) and/or to transport the liquid to be filtered to the membrane 1 and/or to create a hydraulic force that transports the liquid to be filtered to the membrane surface. The liquid flow means is preferably configured (e.g. in the cleaning mode) to create a reverse transmembrane pressure or a reverse liquid flow which conducts the filtered liquid or the liquid in the second conduct portion 3 through the membrane 1 into the first conduct portion 2. The liquid flow means comprises preferably at least one pump. The at least one pump is arranged preferably in the first conduct portion 2 and/or in the second conduct portion 3. The control unit/means or system is configured to control the liquid flow means. The control unit/means or system is preferably configured to control the liquid flow means in the operation mode to create the transmembrane pressure as described above and/or in the cleaning mode to create the reverse transmembrane pressure as described above.

The control unit/means is preferably configured to execute in each filter cycle the operation mode and then to run the cleaning mode. The length (time duration) of the filter cycle, the operation mode and/or the cleaning mode can be configured based on configuration parameters. In a preferred embodiment, the system comprises sensor means for detecting a parameter indicating the end of the operation mode. The control unit/means is configured to end the operation mode and/or start the cleaning mode based on the parameter from the sensor means. The sensor means can comprise a fouling indicator sensor for detecting (as parameter) a level of fouling on the membrane 1. The fouling indicator sensor is preferably a liquid flow detector for detecting (as the parameter) the flow through the membrane 1 (in the operation mode). If the flow goes under a certain threshold, the control unit/means ends the operation mode and starts the cleaning mode. The flow detection sensor could detect for example a flow rate, the liquid speed, the pressure difference or any other parameter indicating the liquid flow. However, other fouling indicating sensor means are also possible, like an optical detection of the fouling.

The control unit/means is preferably further configured (in the operation mode) to control the fouling control means 4 to insert the fouling control additive/particles into the liquid to be filtered. The control unit/means is preferably further configured (in the operation mode) to open the opening or the connection of the fouling control means 4 towards the first conduct portion 2 for adding the fouling control particles 6 and/or the membrane fouling control additive into the liquid to be filtered and/or into the first conduct portion 2 (and to close the opening or connection when the insertion is finished).

The control unit/means is preferably further configured to perform a chemical cleaning after having performed a plurality of filter cycles. The chemical cleaning is preferably a chemically enhanced backwash. The backwash in the cleaning mode of the filter cycles is performed without chemical enhancement, i.e. without chemical additives. Therefore, the backwash in the cleaning mode of the filter cycles is also called a hydraulic backwash. To obtain a chemically enhanced backwash, a chemical (cleaning) additive can be added in the second conduct portion 3 during the backwash or directly a chemical cleaning fluid is conducted from the second conduct portion 3 through the membrane 1 to the first conduct portion 2. The chemical cleaning additive could be an acid, a base, an oxidant, an enzymatic component, a surfactant, a complexing agent and a formulated detergent. The chemically enhanced backwash can be realized by chemically enhancing the backwash of the last filter cycle of the plurality of filter cycles (after which the chemical cleaning is performed) or by a separate chemically enhanced backwash performed after the hydraulic backwash of the last filter cycle (after which the chemical cleaning is performed). The chemical cleaning can happen after a fixed or configured number of filter cycles. The chemical cleaning can also be performed based on the parameter from the sensor means described above. For example, if the parameter after the hydraulic backwash of a filter cycle does not exceed or go under a certain threshold value (indicating the re-established filter capacity of the membrane 1), a chemical cleaning is performed. The same parameter which is also used for the start of the cleaning mode can be used or also a different parameter measured with the same sensor means or a different sensor means can be used. The chemical cleaning is preferably followed by a further post-chemical cleaning step before a new filter cycle starts. The post-chemical cleaning step removes the residuals of the chemical substances used in the chemical cleaning from the membrane 1 and/or the first and the second conduct portion 2.3.

The use of the described fouling control particles allows to re-establish after each hydraulic backwash almost the full filtration capacity of the membrane 1 so that the chemical cleaning is less frequently necessary than before. This improves the environmental impact of the membrane filtration system and increases the operation time of the filtration, because the chemical cleaning requires more downtime than a hydraulic backwash. The less frequent use of chemical cleaning is further advantageous, because the chemical cleaning uses product water, uses chemicals that require special handling prior to disposal and ultimately can harm the membrane and reduce its lifetime.

Subsequently, the process for membrane fouling control is explained at the example steps shown in FIGS. 2 to 5 which represent one exemplary filter cycle. Subsequently, the fouling control particles 6 and the membrane fouling control additive are for the sake of brevity not mentioned each time as alternatives explicitly, but it shall be clarified that they are always interchangeable in the subsequent text.

Figure 2:
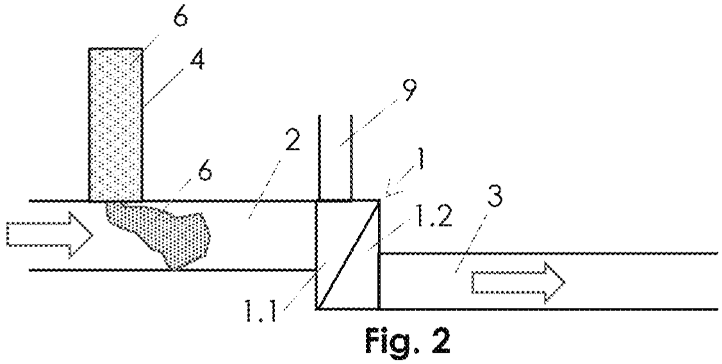
FIG. 2 shows a step of a method for fouling control of introducing a membrane fouling control additive in a liquid to be filtered.

FIG. 2 shows the step of adding the fouling control particles 6 into the first conduct portion 2 and/or into the liquid to be filtered. During this step, the system is preferably in the operation mode. During this step, the liquid to be filtered is preferably conducted through the membrane 1. During this step, the liquid in the first conduct portion 2 is conducted through the membrane 1 into the second conduct portion 3. Preferably, the fouling control particles 6 are added such that they are well distributed, preferably equally distributed in the liquid to be filtered, when it arrives at the membrane 1. This can be achieved by adding the fouling control particles 6, where there is a non-laminar flow or where there are turbulences, e.g. in or close to a pump. As described before, preferably the fouling control particles 6 are added in the operation mode, i.e. when the liquid to be filtered is conducted through the membrane 1. However, it may also be possible to add the fouling control particles 6 partly or completely, before starting the flow through the membrane 1. Preferably, the fouling control particles 6 are added at the beginning of the filter cycle, preferably at the beginning of the operation mode to create immediately the dynamic protective layer 7 on the membrane 1 before too much foulants can come into contact with the membrane 1. The fouling control particles 6 are preferably added within a period of the first 120 seconds (sec), preferably of the first 90 sec, preferably of the first 60 sec of the filtration cycle. Preferably, the adding of the fouling control particles 6 and/or of the membrane fouling control additive is interrupted after a sufficient amount of fouling control particles 6 have been added to create the dynamic protective layer 7. E.g. after 30 to 120 sec depending on the concentration of the fouling control particles 6 added into the liquid to be filtered. For some applications, it showed advantageous to start again to add fouling control particles 6 in the operation mode after the adding has been interrupted for a while (not shown in the figures), e.g. at the end of the operation mode. This helped in some applications for the removal of the dynamic protective layer 7 from the membrane 1 in the cleaning mode. In some applications, it showed beneficial to continuously add the fouling control particles 6 during the whole operation mode.

Figure 3:
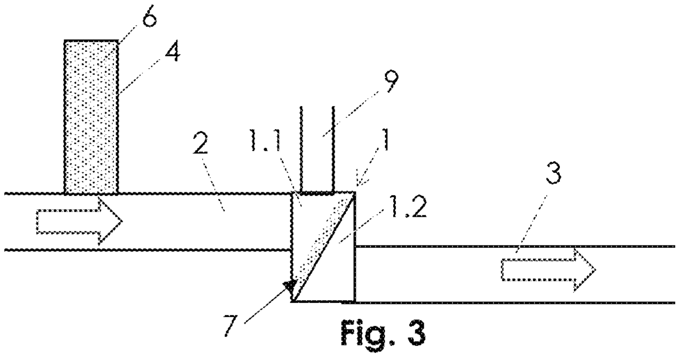
FIG. 3 shows a step of the method for fouling control of forming a dynamic protective layer on the membrane.

FIG. 3 shows a step of forming the dynamic protective layer 7 on the membrane 7. The dynamic protective layer 7 is formed by the fouling control particles 6 added into the liquid to be filtered. The flow of the liquid to be filtered transports the fouling control particles 6 to the membrane 1 which retains the fouling control particles 6 such that they form the dynamic protective layer 7 similar to a filtration cake (see also FIG. 8). The dynamic protective layer 7 is formed and/or held in place by the transmembrane pressure created by the flow of the liquid to be filtered through the membrane 1. The fouling control particles 6 are configured to form on the membrane 1 a porous dynamic protective layer 7 so that the liquid to be filtered can continue to flow through the dynamic protective layer 7 to the membrane 1 and then through the membrane 1.

The step of adding the fouling control particles 6 and the step of forming the dynamic protective layer 7 happen preferably at least partly overlapping. While the fouling control particles 6 are added in the flow of the liquid to be filtered, the dynamic protective layer 7 is formed on the membrane 1 by the liquid flow and/or the transmembrane pressure. The dynamic protective layer 7 is formed on the first side 1.1 of the membrane 1. The period of adding the fouling control particles 6 and of forming the dynamic protective layer 7 can maybe divided in three periods. A first time period in which the fouling control particles 6 are added into the liquid to be filtered and the fouling control particles 6 added are transported to the membrane 1. A second time period in which the fouling control particles 6 are continued to be added into the liquid to be filtered and the dynamic protective layer 7 starts to be formed on the membrane 1 by the fouling control particles 6 arriving on the membrane 1. In this second time period, the dynamic protective layer 7 continues to grow by the newly added fouling control particles 6. A third time period, in which the addition of the fouling control particles 6 is stopped and the forming of the dynamic protective layer 7 is finished while the fouling control particles 6 remained in the liquid to be filtered are transported to the membrane 1 to be deposited on the dynamic protective layer 7. The third time period is obviously omitted, if the fouling control particles 6 are continuously added over the complete time of the operation mode. It is also understood that the fouling control particles 6 can also deposit not only on the membrane 1, but also on the walls of the first conduct portion 2. Later it will however be described how this can be avoided or reduced best.

Figure 4:
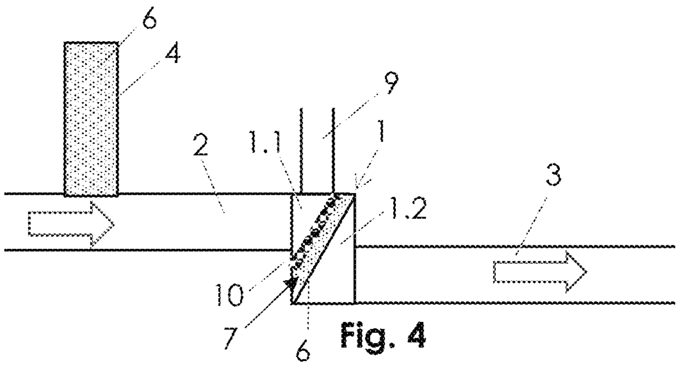
FIG. 4 shows a step of the method for fouling control of retaining foulants in the dynamic protective layer.

The liquid to be filtered and/or the liquid in the first conduct portion 2 into which the fouling control particles 6 are added is preferably the same liquid to be filtered containing the foulants and/or contaminants filtered in the step shown in FIG. 4. This has the advantage that no clean liquid needs to be wasted for depositing/forming the dynamic protective layer 7. However, for certain cases like for very aggressive contaminants and/or foulants which shall at all costs not touch the membrane 1, it would also be possible to use in/during the step(s) of adding the fouling control particles 6 and/or of forming the dynamic protective layer 7 on the membrane 1 for the liquid to be filtered a different liquid than in the step of filtering the liquid to be filtered shown in FIG. 4. This has the advantage that a very clean dynamic protective layer 7 can be formed without any foulants and/or contaminants in between. However, this makes the system for membrane fouling control more complex and increases the waste of clean liquid, and thus in many cases reduces the amount of clean liquid produced by the process.

FIG. 4 shows the step of filtering the liquid to be filtered through the membrane 1 to obtain the filtered liquid and/or the step of conducting the liquid to be filtered from the first conduct portion 2 through the membrane 2 to the second conduct portion 3. The liquid to be filtered needs to traverse first the dynamic protective layer 7 before it traverses the membrane 1. The foulants 10 in the liquid to be filtered are retained by the dynamic protective layer 7 before reaching the membrane 1 and thus preventing membrane fouling of the membrane 1. It is obviously possible that a certain percentage of foulants 10 could pass the dynamic protective layer 7, but in any case, the foulants reaching the membrane 1 is significantly reduced so that membrane fouling is reduced or avoided. The dynamic protective layer 7 can also retain the contaminants of the liquid. The dynamic protective layer 7 can thus be considered like a filtration aid which helps the membrane 1 to filter the liquid to be filtered. The longer the operation mode lasts the more foulants 10 and/or contaminants are retained in the dynamic protective layer 7. Thus, the filtration cake created by the dynamic protective layer 17, the foulants 10 and/or the contaminants grow over time. This reduces the flow rate of the liquid to be filtered through the membrane 1 and/or increases the amount of energy necessary to maintain the same flow rate.

FIG. 5 shows a cleaning step to clean the dynamic protective layer 7 with the retained foulants 10 and/or contaminants. The cleaning step removes/cleans the filtration cake created by the dynamic protective layer 17, the foulants 10 and/or the contaminants. Preferably, the cleaning step creates a cleaning flow of the liquid in the first conduct portion 2 with the filtration cake out of the first conduct portion 2 into a cleaning outlet 9. This cleaning flow is preferably realized by a backwash or backwash operation as shown in FIG. 5 which conducts the filtered liquid from the second conduct portion 3 back through the membrane 1 into the first conduct portion 2. One of the selection criteria for the fouling control particles 6 is the easy cleanability from the membrane 1. Preferably, the cleaning operation is done by a physical cleaning like the backwash. However, it is also possible to use a chemical cleaning step. Most preferably, the cleaning step of the filter cycles are physical cleaning steps and once in a while a chemical cleaning step is used to remove some irreversible fouling created notwithstanding the dynamic protective layer 7. Before starting the cleaning step/mode, the operation mode is preferably ended and the liquid to be filtered is not conducted any more from the first conduct portion 2 to the second conduct portion 3. After the cleaning step/mode has ended, the cleaning outlet 9 is closed. In another less preferred embodiment, it is also possible to conduct the filtration cake back into the first conduct portion 2 instead of out of the cleaning outlet 9. This would avoid the cleaning outlet 9 but would worsen the quality of the liquid to be filtered in the first conduct portion 2. After the cleaning step/mode a new filter cycle can start.

Preferably, the system or process comprises a plurality of subsequent filter cycles as described above.

In one embodiment, the process could comprise the optional step of forming the fouling control particles in situ, before adding them to the liquid to be filtered. This could be achieved by a chemical reaction as explained in more detail above.

The fouling control particles 6 have preferably an average size smaller than or equal to 10 μm, preferably smaller than or equal to 5 μm, preferably smaller than or equal to 1 μm, preferably smaller than or equal to 0.5 μm, preferably smaller than or equal to 0.3 μm. The smaller the particles are, the more homogenous is the deposition of the fouling control particles 6 to form the dynamic protective layer 7. Preferably, the average particle size of the fouling control particles 6 is larger than 0.05 μm, preferably than 0.1 μm, preferably than 0.15 μm. However, it showed that the average particle size is actually less important than the boundaries of the size distribution like the $d_{10}$ and the $d_{90}$. This is because particles at this average size dimensions tend to have a very broad size distribution. Without controlling the size distribution, the average particle size might not help to reach the function of the aimed average size. FIG. 6 shows an exemplary size distribution with $d_{10}$ and the $d_{90}$ for the fouling control particles 6.

The fouling control particles 6 have preferably a size distribution with a $d_{10}$ larger than the defined pore size of the membrane 1, preferably than twice the defined pore size of the membrane 1, preferably than three times the defined pore size of the membrane 1, preferably than five times the defined pore size of the membrane 1, preferably than seven times the defined pore size of the membrane 1, preferably than nine times the defined pore size of the membrane 1, preferably than ten times the defined pore size of the membrane 1. FIGS. 7 and 8 show for illustration purposes a schematic membrane 1 with one single defined pore size and one single fouling control particle 6 size, i.e. with a Dirac distribution of the pore size and of the fouling control particle size. In FIG. 7, it is shown what happens, if the fouling control particle 6 size is smaller than the defined pore size. The fouling control particles 6 enter the pores 5 of the membrane 1 and deposit in the pores 5. This narrows the pores 5 of the membrane 1 and negatively influences the flow of the liquid to be filtered through the membrane 1. This is also called standard blocking in membrane technology. FIG. 8 shows schematically a dynamic protective layer 7 on the membrane 1 which does not block the pores 5, because the fouling control particles 6 do not lead to standard blocking in the pores 5.

The fouling control particles 6 have preferably a size distribution with a $d_{90}$ smaller than 15 μm, smaller than 10 μm, preferably than 5 μm, preferably than 1 μm, preferably than 0.5 μm. This helps to guarantee that the fouling control particles 6 form the dynamic protective layer 7 homogenously on the membrane surface. If the $d_{90}$ of the fouling control particles 6 becomes too large, the deposition of the fouling control particles 6 becomes too heterogenous. This disturbs the functioning of the dynamic protective layer 7 and could reduce the operative membrane surface. For example, hollow fiber membranes 1 or tubular membranes 1 provide the membrane surface 1.1 within long hollow fibers or tubes with the pores 5 in the fiber or tube walls. If the fouling control particles 6 have a $d_{90}$ larger than mentioned above, it leads to a heterogeneous deposition of the fouling control particles 6 with the larger particles being mainly concentrated at the end of the tubes or fibers. This leads to an insufficient creation of the dynamic protective layer 7 for effective fouling control at the beginning of the tubes or fibers and a dynamic protective layer 7 at the end of the tubes or fibers which is too thick and blocks the flow through the tubes or fibers and/or through the dynamic protective layer 7 to the pores 5. A small average particle size of the fouling control particles 6 alone does not guarantee a homogenous deposition. If the fouling control particles have a wide size distribution or a large $d_{90}$ they tend to a heterogenous deposition of the fouling control particles 6. A dynamic protective layer 7 made out of heterogeneously deposited fouling control particles 6 blocks the pores 5 of the membrane 1 and reduce the efficiency of the fouling control. Therefore, the fouling control particles 6 having a $d_{90}$ below the above-mentioned values, will significantly improve the quality and performance of the dynamic protective layer 7 for the membrane fouling control of the membrane 1.

The fouling control particles 6 are preferably synthetic precipitate particles. Synthetic precipitate particles have the advantage that their characteristics like size, thermal stability, mechanical stability, polydispersity index, zeta potential, BET surface are and/or maybe others can be well controlled when they are manufactured.

Preferably, the fouling control particles 6 and/or the synthetic precipitate particles comprise/are metal precipitate particles and/or mineral precipitate particles. Preferably, the fouling control particles 6 and/or the synthetic mineral precipitate particles are based on calcium and/or magnesium. This family of mineral precipitates offers tunable and environmentally compatible particles.

In one embodiment, the fouling control particles 6 and/or the synthetic mineral precipitate particles comprise/are precipitated calcium carbonate (PCC).

In one embodiment, the fouling control particles 6 and/or the synthetic mineral precipitate particles comprise/are precipitated hydromagnesite.

In one embodiment, the fouling control particles 6 and/or the synthetic mineral precipitate particles comprise/are mineral composite particles containing a mixed solid phase of two minerals, preferably of calcium and of magnesium, preferably of synthetic calcium carbonate and of synthetic magnesium carbonate, preferably of (synthetic precipitated) calcium carbonate and of (synthetic) hydromagnesite.

Synthetic calcium/magnesium carbonate originates from natural calcium/magnesium carbonates which have been calcined to produce calcium/magnesium oxide by removing $CO_2$ during calcination. Natural calcium carbonate is generally called limestone. Natural magnesium carbonate is generally called magnesite, but can exist under several hydrated forms. Natural calcium-magnesium carbonate is generally called dolomite. When the calcium/magnesium oxide is produced by calcination, it can be further hydrated to form a hydrated form or a slaked form, which can be further carbonated to form precipitates of calcium/magnesium carbonates (under pressure or not). Typically, the molar ratio of calcium to magnesium in natural dolomite is comprised between 0.8 and 1.2. This ratio can be modified by slaking the oxide in the presence of magnesium hydroxide or calcium hydroxide to about 0.1 to 10.

The precipitated calcium/magnesium carbonate can also contain impurities coming from the naturally occurring form. The impurities notably comprise all those which are encountered in natural limestones and dolomites, such as clays of the silico-aluminate type, silica, impurities based on iron or manganese at an amount of maximum 10 wt %, preferably maximum 5 wt %, preferably maximum 1 wt %.

Generally, the $CaCO_3$, $MgCO_3$, $Ca(OH)_2$ and $Mg(OH)_2$ contents in calcium-magnesium compounds may easily be determined with conventional methods.

The composite particle comprises preferably a core of the first mineral material and/or a shell of the second material. Preferably the first mineral material is a mineral precipitate, preferably a calcium based mineral, preferably a PCC.

The PCC core comprises preferably mainly calcite with some trace of aragonite. Calcite and aragonite are two crystalline structures of calcium carbonate $CaCO_3$.

In another embodiment of the invention, the PCC core may further contain calcium hydroxide $Ca(OH)_2$, e.g. in portlandite form. It is to be noted that the PCC core always has a majority weight proportion of calcite, aragonite or a mixture of both.

PCC can be obtained by controlled carbonation of quicklime as explained before and the literature reported some carbonation of a milk of lime in presence of additives, such as for example for paper manufacturing (see US20189170765).

Preferably, the second mineral material is a magnesium based material, preferably comprises hydromagnesite, preferably hydromagnesite with only some traces of nesquehonite. Hydromagnesite, also called basic magnesium carbonate has the formula $Mg_5(CO_3)_4(OH)_2.4H_2O$ or $4MgCO_3{\cdot}Mg(OH)_2{\cdot}4H_2O$. In the International Centre for Diffraction Data database (ICDD), hydromagnesite corresponds to the datasheets carrying references 00-025-0513 (monoclinic) or 01-070-1177 (orthorhombic). In one embodiment, the monoclinic hydromagnesite is used. In another embodiment, the orthorhombic hydromagnesite is used. Hydromagnesite must not be confused with magnesite, a magnesium carbonate of formula $MgCO_3$, or with nesquehonite, a hydrated magnesium carbonate of formula $MgCO_3{\cdot}3H_2O$, which are to be avoided according to the invention.

In one embodiment of the invention, the second mineral material may further contain periclase MgO and/or brucite $Mg(OH)_2$. The proportions of these different components in the second mineral material of the invention, in addition to the synthetic calcium carbonates and hydromagnesite, can be related to the operating conditions and properties of the hydrated dolomite used for the carbonation method allowing the obtaining of the mixed solid phase in the second mineral material according to the invention described below. Fully hydrated dolomite (hydrated under pressure to prevent the residual presence of MgO in the hydrated dolomite) will lead to higher contents of $Mg(OH)_2$ in the mixed solid phase of the second mineral material according to the invention than if a partially hydrated dolomite is used, the latter possibly leading to the presence of MgO in the mixed solid phase of the second mineral material according to the invention.

An example about a way to produce a mineral composition particles containing a mixed solid phase of calcium carbonate and of magnesium carbonate is described in detail in WO2013/139957 and WO2015/039994 which are incorporated by reference in here. According to the state-of-the-art documents, the synthetic mineral precipitate does not present the particle size distribution making the synthetic mineral precipitate suitable for fouling control of membrane and providing the aforementioned advantages. However, according to the present invention, the manufacturing process is adapted by controlling the growth of the mixed solid phase of calcium carbonate in such a way it shows a particle size distribution characterized by $d_{50}<5$ μm, $d_{90}<15$ μm and a $d_{10}$ comprised between 200 nm and 3 μm. Optionally, grinding or sieving step can be performed to remove too large particles or concentrate in very fine particles.

Preferably, the fouling control particles containing a mixed solid phase (of calcium carbonate and of magnesium carbonate) comprise PCC as one of the two minerals or the first of the two minerals.

Preferably, the fouling control particles containing a mixed solid phase (of calcium carbonate and of magnesium carbonate) comprise hydromagnesite as one of the two minerals or the second of the two minerals.

Such a mixed solid phase has a further unexpected advantage in that its specific surface area is larger than that of usual synthetic calcium carbonates which have a specific surface area in the order of 4 to 15 $m^2/g$. In one advantageous embodiment of the present invention, the mixed solid phase has a specific surface area of 15 $m^2/g$ or larger, more particularly larger than 20 $m^2/g$ and preferably 25 $m^2/g$ or larger, possibly reaching 35 $m^2/g$. By "specific surface area" used in the present invention is meant the specific surface area measured by manometric nitrogen adsorption and calculated using the Brunauer, Emmett and Teller model (BET method) after degassing at 190° C.

The mixed solid phase present preferably a bulk density equal to or lower than 250 $kg/m^3$ and equal to or higher than 80 $kg/m^3$ measured in accordance with standard EN 459.2

The fouling control particles are in one embodiment inert, like for PCC or precipitated hydromagnesite or for other inert mineral precipitates. In another embodiment, the fouling control particles are reactive or functionalized. The composite particles described before are preferably functionalized.

The proposed solutions target to enhance the hydraulic performance and rejection capacity of membrane 1 by applying a dynamic protective layer on the surface of the membrane 1 at each filtration cycle, preferably at its start. The dynamic protective layer will act as a filtration aid to help control flow through the membranes. The dynamic protective layer consists of preferably of particles of ultrafine precipitated calcium carbonate (i.e., nano-PCC). The dynamic protective layer forms a porous layer on the membrane surface and becomes the filtering medium that traps the solids and prevents them from fouling the membrane surface and pores. Dynamic protective layer filtration is principally mechanical, not chemical in nature; particles interlace and overlay leaving a large network of interstitial void space that can allow the flow of water.

The proposed invention of membrane pretreatment was tested against water pretreatment based on a coagulation solution (i.e., using $FeCl_3$ for pretreatment of the liquid to be filtered). For all experiments, canal water collected from Arquennes was used as liquid to be filtered. A lab-scale membrane module based on an ultrafiltration membrane 1 was used for the testing. The molecular weight cut-off (MWCO) of the membrane 1 used was 150 kDa, i.e. a defined pore size of 0.02 μm. The surface area for filtration was approximately 0.08 $m^2$. Filtration was performed in a dead-end mode for 10 consecutive cycles of filtration and backwash. Filtration flux was set at a constant rate of 190 $dm^3/(m^2 \cdot h)$ ($dm^3$ per square metre per hour) for a duration of 15 minutes per cycle. After each filtration cycle, a backwash step was performed at a flux of 250 $dm^3/(m^2 \cdot h)$ for 1 minute. FIG. 9 shows the result of the coagulation solution, while FIG. 10 shows the result of the solution proposed by the present invention. The transmembrane pressure (TMP) was recorded throughout the consecutive cycles as an operational indicator of membrane performance and is plotted in FIGS. 9 and 10. The second Y-axis on the right shows the TMP in bar (lower curve). At the end of 10 consecutive cycles of filtration and backwash, a chemically enhanced backwash step was performed using caustic soda, oxidant and acid, followed by rinsing with demineralized water. Each chemical was introduced into the membrane system at 250 $dm^3/(m^2 \cdot h)$ for a duration of 1 minute, followed by soaking for 10 minutes and rinsing with demineralized water for 1 minute. The first Y-axis on the left shows the feed volume per hour in $dm^3/h$ (or litres per hour-l/h upper curve).

The coagulant solution was established by treating the liquid to be filtered with an equivalent concentration of 1 $mgFe^{3+}/dm^3$. The coagulant was added to the feed tank and mixing was applied at 350 rpm for 1 minute to ensure rapid dispersion of coagulant and destabilization of colloids/particulate matter in the liquid to be filtered. Thereafter a slow mixing intensity of 50 rpm was applied for the remaining duration of the testing. Results are illustrated in FIG. 10. The TMP begins at 0.35 bar at the start of the experiment and climbs up to a value of 0.85 bar after 10 consecutive cycles of filtration and backwash. Hydraulic backwashing is not sufficient to recover the TMP at the end of each cycle.

The experiment based on the solution according to the invention was performed using as fouling control particles 6 ultrafine PCC of a $d_{10}$ of the size distribution of the fouling control particles of 0.08 μm and a $d_{90}$ of the size distribution of the fouling control particles 6 of 0.15 μm. The PCC stock solution was diluted to a solids concentration of 0.5% and stirred continuously at 50 rpm to avoid sedimentation. The fouling control particles 6 were introduced into liquid to be filtered at the start of each filtration cycle via the feed line. Thereafter, canal water was filtered through the membrane for 15 minutes and the cycle was ended by a backwash to remove the PCC dynamic protective layer 7 and the foulants 10. Chemically enhanced backwash was performed after 10 filtration cycles. Results are given in FIG. 10. The TMP is approximately constant throughout the duration of the experiment at 0.45 bar. Pressure increase during a filtration cycle is minimal and the permeability can almost be completely recovered at the end of the cycle. This allows to make significantly longer filtration cycles and to significantly increase the number of filtration cycles with a physical cleaning before a chemical cleaning is needed. This reduces power needed for establishing the TMP, increases operation time of the membrane 1 and reduces the amount of chemicals needed for cleaning.

Another experiment was performed with the following experimental protocol. Surface water membrane filtration experiments were performed on an automated pilot, where feed, permeate, retentate and backwash valves and pumps are automatically switched. Continuous readings of flow rates and pressures were performed. An ultrafiltration membrane module with a total surface of 0.8 $m^2$ was used for these experiments with a defined pore size of 30 nm. The quality of the surface water used has been characterized by a pH of 8, a conductivity of 670 μS/cm, a DOC of 9 mg/L, a TOC of 12 mg/L, a $Ca^{2+}$ of 97 mg/L, a $Mg^{2+}$ of 10 mg/L and an Alkalinity of 5 mmol/L. A total of 7 cycles was performed per PCC product (315 min). With the pressure readings, transmembrane pressure (TMP) was calculated, as well as permeability, K (Flux=82.5 $L/m^2 \cdot h$ for these experiments). Permeability variation across the test (dK/dt) was measured for a duration of 6 cycles (270 min), taking permeability at the beginning of cycles 1 and 7. Each filter cycle comprises around 45 min of operation mode and subsequently a cleaning mode. Considering a critical permeability value ($K_{critical}$) of 150 $L/m^2$ h (value below which a chemical backwash is needed to continue operation), the chemically enhanced backwash frequency ($CEB_F$) was calculated. The higher this value, the better the filtration performance.

$$\text{Trans-membrane pressure: } TMP \text{ [bar]} = P_{feed} - P_{permeate}$$

$$\text{Permeability: } K\left[\frac{L}{m^2.\ h.\ \text{bar}}\right] = \frac{\text{Flux}}{TMP} = \frac{Q}{A \times TMP}$$

$$CEBF[h] = \frac{K_{initial} - K_{critical}}{\frac{dK}{dt}}$$

These parameters have been used for the following four measurements.

In a first measurement, a PCC suspension at 0.6 wt % solid content was prepared, put under agitation, and injected onto the membrane surface with a dosing of 25 mg solids/L of filtered water at the beginning of the operation mode of the filter cycle, resulting in a PCC dynamic protective layer 7 thickness of 0.58 μm (first portion of the operation mode). This was followed by a surface water filtration cycle of 45 min (second portion of the operation mode), at the end of which the membrane was backwashed with permeate water (cleaning mode). At that moment, the PCC layer (sacrificial layer) was washed out together with any contaminants. The PCC particles used had a d10 of 0.05 μm, a d50 of 0.07 μm and a d90 of 0.12 μm.

In a second measurement, the same PCC suspension was mixed at the beginning in the feed water corresponding to the same amount of membrane fouling control additive added less concentrated and more continuously over the complete operation mode as it is done in the state of the art for the purpose of coagulation OR feed water conditioning (not shown).

In a third measurement, the same experiment has been performed without any fouling control particles added.

In a fourth measurement, a state-of-the-art PCC has been used injected on the membrane 1 as in the first measurement (not shown).

FIG. 12 shows the TMP 16 over time for the first measurement and the TMP 15 over time for the third measurement. It can be clearly seen that without the PCC dynamic protective layer 7, the TMP of the third measurement 15 increases much more each cycle than the TMP of the first measurement 16 with the dynamic protective layer 7. The $CEB_F$ frequency was calculated for the measurement 16 with 29 hours while it was only 8-9 hours for the third measurement 15. Also, the $CEB_F$ for the second measurement was only 15 h. That means that the continuous injection of the fouling control particles have a reduced effect compared to a concentrated injection at the beginning of the operation mode. The state of the art PCC showed only a $CEB_F$ of 11 h and performed thus much worse than the PCC in the inventive value ranges of the particle distribution.

Another embodiment of the invention is an upgrade kit for upgrading a membrane filtering system to a membrane filtering system with a fouling control system, e.g. as the one described above. The membrane filtering system already comprises the first conduct portion 2, the membrane 1 and the second conduct portion as described above. The upgrade kit comprises the fouling control means 4 and the control means. The fouling control means 4 is configured to be installed in the first conduct portion 2 (as described also above). The fouling control means 4 is preferably filled with fouling control particles and/or membrane fouling control additive. The control means is configured to upgrade the membrane filtering system such that the upgraded membrane filtering system is run/executed in the one or more filtering cycles (as described in more detail above). The control means can be a control unit which is installed on the membrane filtering system and operatively connected to the liquid flow means of the membrane filtering system and/or to the fouling control mean 4 installed. The control means can however also be a software upgrade on an existing control unit of the membrane filtering system.

A further embodiment of the invention is an upgrade method to upgrade a membrane filtering system (as described above) for fouling control.

The upgrade method comprises the step of providing a fouling control means 4 filled with the fouling control particles and/or the membrane fouling control additive. If the membrane filtering system comprises already an additive means (e.g. for coagulants or other additives) for releasing an additive in the liquid to be filtered in the second conduct portion 2, this additive means can be filled with the fouling control particles and/or the membrane fouling control additive to obtain the fouling control means 4 filled with the fouling control particles. If such an additive means is not present or not suitable for the membrane fouling control additive or needed for other additives, the fouling control means 4 is installed in the membrane filtering system to be able to release its content into the first conduct portion 2. The fouling control means 4 is preferably filled with the membrane fouling control additive.

The upgrade method comprises the further step of installing the control means in the membrane filtering system. This step can comprise the installation of a control unit and/or the installation of a software program (e.g. a firmware) and/or the connection of the control unit/means with the fouling control means 4 and/or liquid flow means.

The resulting upgraded membrane filtering system results in a system for fouling control as described above.

It should be understood that the present invention is not limited to the described embodiments and that variations can be applied without going outside of the scope of the claims.

The invention claimed is:

1. A process for membrane fouling control comprising one or more filter cycles, wherein a filter cycle of the one or more filter cycles comprises an operation mode and a cleaning mode, wherein the operation mode comprises the steps of:

conducting a liquid through a membrane having a defined pore size, adding fouling control particles upstream of the membrane into the liquid, the fouling control particles added into the liquid forming a dynamic protective layer directly against the membrane such that, when the liquid contains foulants, the foulants are retained in the dynamic protective layer before the liquid is conducted through the membrane, wherein the cleaning mode comprises the step of:

cleaning the dynamic protective layer from the membrane by a backwash, wherein:

the fouling control particles are inert calcium carbonate and/or hydromagnesite, a particle size distribution $d_{10}$ of the fouling control particles is larger than the defined pore size, wherein $d_{10}$ refers to the size at which 10% of a distribution is below the $d_{10}$, and a particle size distribution $d_{90}$ of the fouling control particles is smaller than or equal to 15 μm, wherein doo refers to the size at which 90% of the distribution is below the $d_{90}$; and wherein the dynamic protective layer is formed and maintained on the membrane by a transmembrane pressure generated across the membrane as a result of conducting the liquid to be filtered through the membrane and/or by the permeate flux.

2. The process according to claim 1, wherein the fouling control particles are synthetic mineral precipitate particles.

3. The process according to claim 1, wherein the fouling control particles comprise composite particles of a first mineral which is calcium carbonate and a second mineral which is hydromagnesite.

4. The process according to claim 3, wherein the composite particles comprise a core of the first mineral and a shell of the second mineral.

5. The process according to claim 1, wherein the fouling control particles are added as a powder into the liquid.

6. The process according to claim 1, wherein the dynamic protective layer is formed and/or maintained on the membrane by a transmembrane pressure generated across the membrane as a result of conducting the liquid through the membrane.

7. The process according to claim 1, wherein the membrane has a defined pore size larger than 10 nm.

8. The process according to claim 1, wherein said liquid is an aqueous liquid.

9. The process according to claim 8, wherein the liquid is selected from the group consisting of municipal wastewater, seawater, industrial process water and industrial wastewater, source water for municipal drinking water, brackish water, fresh ground water and fresh surface water.

* * * * *